Dec. 27, 1927.

A. FREUND 1,654,367

VEHICLE WHEEL

Filed March 29, 1927

INVENTOR
ALFRED FREUND
BY
ATTORNEY

Dec. 27, 1927.

A. FREUND 1,654,367

VEHICLE WHEEL

Filed March 29, 1927

INVENTOR
ALFRED FREUND
BY Munn & Co.
ATTORNEY

WITNESSES

Patented Dec. 27, 1927.

1,654,367

UNITED STATES PATENT OFFICE.

ALFRED FREUND, OF ST. LOUIS, MISSOURI.

VEHICLE WHEEL.

Application filed March 29, 1927. Serial No. 179,272.

My invention relates to vehicle wheels and particularly to wheels having an inner inflated tire disposed between the inner and outer fellies of a wheel, and the present invention has for its particular object to improve the tire structure with respect to the means connecting the inner and outer fellies.

The invention is designed more especially as an improvement on two inventions forming the subject matter of a patent granted to me August 8th, 1916, No. 1,194,163, and a patent granted to me January 23rd, 1923, No. 1,443,319.

Reference is to be had to the accompanying drawings forming a part of this specification, it being understood that the drawings are merely illustrative of one form of the invention.

Figure 1:
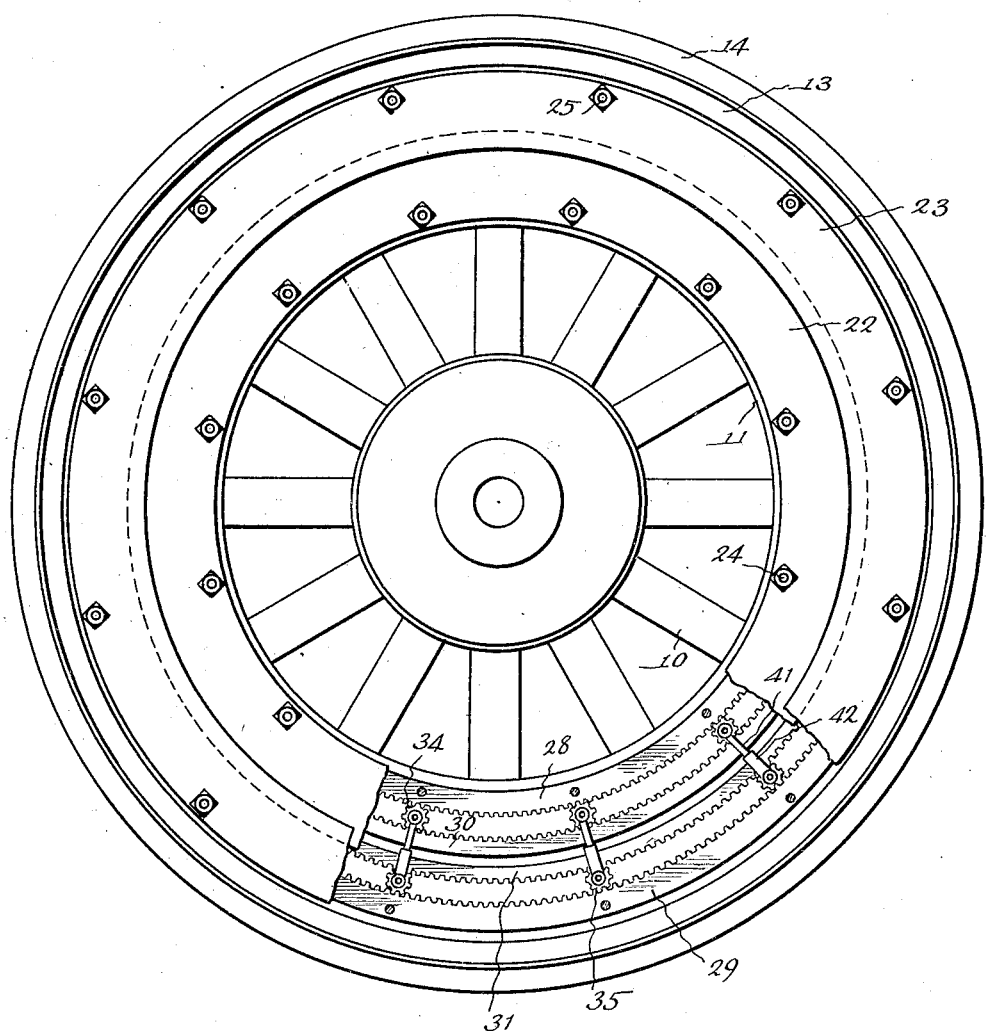
Figure 1 is a side elevation of a wheel equipped with my present invention, parts being broken away.
Figure 2:
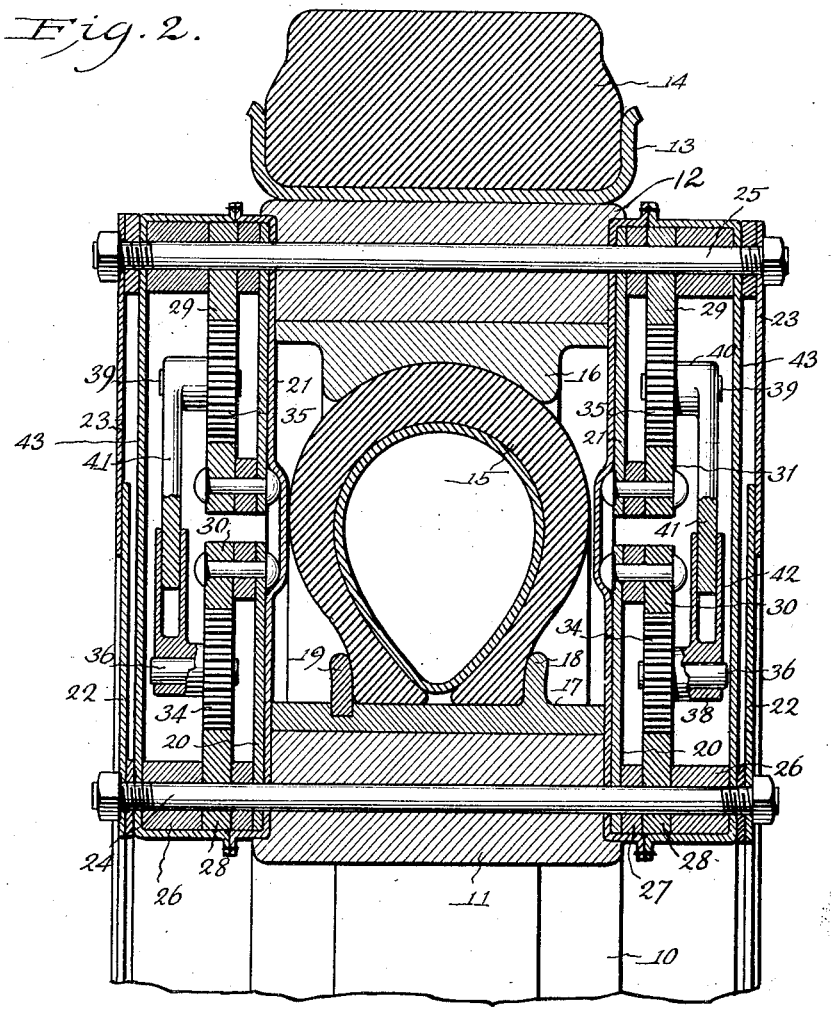
Figure 2 is a cross section of a portion of said wheel.

In carrying out my invention in practice the wheel 10 is provided with an inner felly 11 and an outer felly 12, the outer felly having a tire rim 13 adapted to receive a cushion tire 14. Between the fellies 11, 12 is interposed an inflatable tire 15 of any approved form about which extends a bearing ring 16. At the inner side of tire 15 and forming a seat therefor is an inner rim 17 shown in the last mentioned one of my previous patents above referred to and having an integral annular body 18 at one side of the tire and a retaining ring 19 at the opposite side.

At each side of the tire a novel connecting means is provided between the inner felly 11 and the outer felly 12, and as said means is the same at each side it will suffice to describe one. An inner annular plate 20 disposed radially, is positioned against the inner felly 11 and a similar outer flat ring 21 is positioned against the outer felly 12.

Similarly, housing plates 22 are provided overlapping similar housing plates 23. An inner bolt 24 passes through the felly 11 and an outer bolt 25 passes through the felly 12. The bolt 24 passes transversely also through spacing blocks 26, 27, between which is an annular rack 28. A similar outer annular rack 29 is provided through which passes the outer bolt 25. Riveted to the inner plate 20 is an annular rack 30 spaced from the rack 28 and having its teeth disposed toward the teeth on said rack 28. Also an annular rack 31 is provided within the plane of the rack 29 and with the teeth of the two racks oppositely disposed. Between the inner pair of racks 28, 30, is interposed, in mesh with the racks, a series of pinions 34. A series of pinions 35 is disposed between the racks 29, 31 of the outer pair and meshing with the teeth thereof. The pinion 34 is on a stud shaft 36 and the pinion 35 is on a stud shaft 39. On the stud shaft 36 is the hub 38 of a sleeve or tube 42 and on the stud shaft 39 is a hub 40 from which extends a pin 41 telescoping in the sleeve 42.

The numeral 43 indicates a flexible casing extending annularly at each side about the wheel and enclosing the described racks and pinions with the telescoping elements. The casings or bags 43 may be made of leather or equivalent flexible material. Said casings or bags 43 are adapted to form oil reservoirs to lubricate the assemblage within.

Figure 3:
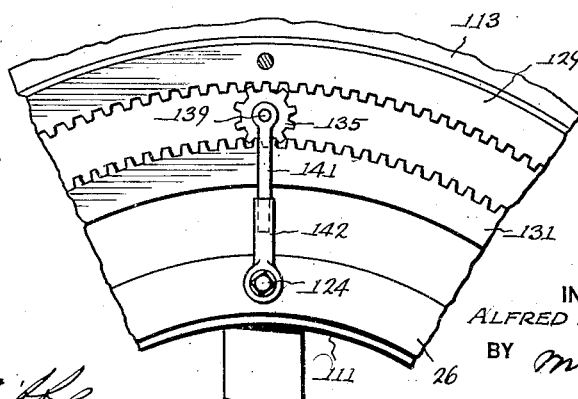
Figure 3 is a fragmentary view in the plane of the wheel, illustrating a modification.

Referring to Figure 3, the numeral 113 indicates a tire rim corresponding with the rim 13. The numeral 129 indicates an annular rack having internal teeth and corresponding with the rack 29. Instead of two pairs of racks, a single annular rack 131 is spaced from the rack 129 and externally toothed. Between the racks 129, 131, pinions 135 are employed, one of which is shown on a stud axle 139, on which is the hub of the pinion 135. The arm 141 corresponding with the arm 41 telescopes in the sleeve 142 corresponding with the sleeve 42 and the bolt 124 corresponds with the bolt 24 and extends through the inner felly 111.

I would state furthermore that while the illustrated example constitutes a practical embodiment of my invention, I do not limit myself strictly to the exact details herein illustrated, since, manifestly, the same can be considerably varied without departure from the spirit of the invention, as defined in the appended claims.

What I claim is:

1. In a wheel, inner and outer fellies spaced radially from each other, an inflatable tire between the fellies, pairs of annular racks disposed at each side of the tire, the racks of a pair being disposed with their teeth toward each other, a series of pinions positioned between the racks of each pair and meshing with the teeth thereof, elements on which said pinions are turnably mounted, the elements on which the pinions between one pair of racks are mounted telescoping with the elements on which the pinions of the racks of the other pair are mounted.

2. In a wheel, inner and outer fellies spaced radially from each other, an inflatable tire between the fellies, pairs of annular racks disposed at each side of the tire, the racks of a pair being disposed with their teeth toward each other, a series of pinions positioned between the racks of each pair and meshing with the teeth thereof, elements on which said pinions are turnably mounted, the elements on which the pinions between one pair of racks are mounted telescoping with the elements on which the pinions of the racks of the other pair are mounted; together with side plates to which the adjacent racks of the respective pairs are secured and overlapping slidably engaged housing plates on the outer side of the said telescoping elements.

3. In a wheel, inner and outer racks disposed in pairs extending about the wheel, pinions between the racks, and pairs of telescoping members, one telescoping member of each pair associated with one of said pinions and the other telescoping member associated with the wheel radially inward from the pinions.

ALFRED FREUND.